US008752074B2

(12) United States Patent
Hansen

(10) Patent No.: US 8,752,074 B2
(45) Date of Patent: *Jun. 10, 2014

(54) SCRIPTING OF SOAP COMMANDS

(75) Inventor: James R. Hansen, Franklin, MA (US)

(73) Assignee: Axeda Corporation, Foxboro, MA (US)

(*) Notice: Subject to any disclaimer, the term of this patent is extended or adjusted under 35 U.S.C. 154(b) by 80 days.

This patent is subject to a terminal disclaimer.

(21) Appl. No.: 13/252,437

(22) Filed: Oct. 4, 2011

(65) Prior Publication Data
US 2012/0158982 A1 Jun. 21, 2012

Related U.S. Application Data

(60) Continuation of application No. 11/673,943, filed on Feb. 12, 2007, now Pat. No. 8,060,886, which is a division of application No. 10/123,960, filed on Apr. 17, 2002, now Pat. No. 7,178,149.

(51) Int. Cl.
G06F 3/00 (2006.01)
G06F 9/54 (2006.01)
G06F 9/44 (2006.01)

(52) U.S. Cl.
CPC . G06F 9/54 (2013.01); G06F 9/541 (2013.01); G06F 9/547 (2013.01); G06F 9/44 (2013.01)
USPC .......................................................... 719/328

(58) Field of Classification Search
CPC ........... G06F 9/54; G06F 9/541; G06F 9/547; G06F 9/44
USPC ................................................. 719/328, 330
See application file for complete search history.

(56) References Cited

U.S. PATENT DOCUMENTS

| 4,086,434 | A | 4/1978 | Bocchi |
| 4,412,292 | A | 10/1983 | Sedam et al. |
| 4,497,037 | A | 1/1985 | Kato et al. |
| 4,583,834 | A | 4/1986 | Seko et al. |
| 4,853,946 | A | 8/1989 | Elliott et al. |
| 4,962,368 | A | 10/1990 | Dobrzanski et al. |
| 4,964,065 | A | 10/1990 | Hicks et al. |
| 4,965,946 | A | 10/1990 | Hegedus et al. |
| 4,996,703 | A | 2/1991 | Gray |
| 5,038,319 | A | 8/1991 | Carter et al. |
| 5,057,866 | A | 10/1991 | Hill, Jr. et al. |
| 5,061,837 | A | 10/1991 | Gilbert et al. |
| 5,077,582 | A | 12/1991 | Kravette et al. |

(Continued)

FOREIGN PATENT DOCUMENTS

EP 0874306 10/1998
EP 1 191 744 3/2002

(Continued)

OTHER PUBLICATIONS

Lerner, At the Forge introducing SOAP, 2001.*

(Continued)

Primary Examiner — Lechi Truong
(74) Attorney, Agent, or Firm — Fish & Richardson P.C.

(57) ABSTRACT

A computer-implemented method processes a simple object access protocol (SOAP) command. The method includes interpreting an XML script to perform a function contained in the XML script, the XML script containing the SOAP command, parsing the SOAP command from the XML script, and passing the SOAP command to a SOAP interpreter for execution.

22 Claims, 2 Drawing Sheets

(56) References Cited

U.S. PATENT DOCUMENTS

| | | |
|---|---|---|
| 5,084,875 A | 1/1992 | Weinberger et al. |
| 5,129,080 A | 7/1992 | Smith |
| 5,138,377 A | 8/1992 | Smith et al. |
| 5,163,151 A | 11/1992 | Bronikowski et al. |
| 5,184,179 A | 2/1993 | Tarr et al. |
| 5,204,699 A | 4/1993 | Birnbaum et al. |
| 5,212,645 A | 5/1993 | Wildes et al. |
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,261,061 A | 11/1993 | Ju |
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,430,709 A | 7/1995 | Galloway |
| 5,434,650 A | 7/1995 | Nakahara et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,485,142 A | 1/1996 | Stute et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,528,691 A | 6/1996 | Rosauer et al. |
| 5,530,899 A | 6/1996 | MacDonald |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,579,087 A | 11/1996 | Salgado |
| 5,586,254 A | 12/1996 | Kondo et al. |
| 5,594,529 A | 1/1997 | Yamashita et al. |
| 5,600,301 A | 2/1997 | Robinson, III |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,619,716 A | 4/1997 | Nonaka et al. |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,696,903 A | 12/1997 | Mahany |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,727,248 A | 3/1998 | Ogura |
| 5,732,212 A | 3/1998 | Perholz et al. |
| 5,736,965 A | 4/1998 | Mosebrook et al. |
| 5,740,801 A | 4/1998 | Branson |
| 5,745,268 A | 4/1998 | Eastvold et al. |
| 5,748,892 A | 5/1998 | Richardson |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Ezekiel |
| 5,798,738 A | 8/1998 | Yamada |
| 5,801,964 A | 9/1998 | McCarthy |
| 5,809,237 A | 9/1998 | Watts et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,826,027 A | 10/1998 | Pedersen et al. |
| 5,828,943 A | 10/1998 | Brown |
| 5,835,816 A | 11/1998 | Sawada et al. |
| 5,835,911 A | 11/1998 | Nakagawa et al. |
| 5,844,550 A | 12/1998 | Trainor et al. |
| 5,845,061 A | 12/1998 | Miyamoto et al. |
| 5,845,230 A | 12/1998 | Lamberson |
| 5,857,207 A | 1/1999 | Lo et al. |
| 5,857,967 A | 1/1999 | Frid et al. |
| 5,862,348 A | 1/1999 | Pedersen |
| 5,862,404 A | 1/1999 | Onaga |
| 5,865,745 A | 2/1999 | Schmitt et al. |
| 5,872,635 A | 2/1999 | Akiyama |
| 5,872,928 A | 2/1999 | Lewis et al. |
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |

(56) References Cited

U.S. PATENT DOCUMENTS

| | | |
|---|---|---|
| 5,894,416 A | 4/1999 | Kuroyanagi et al. |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama et al. |
| 5,911,095 A | 6/1999 | Atsumi et al. |
| 5,913,060 A | 6/1999 | Discavage |
| 5,917,405 A | 6/1999 | Joao |
| 5,923,842 A | 7/1999 | Pedersen et al. |
| 5,933,675 A | 8/1999 | Sawada et al. |
| 5,935,060 A | 8/1999 | Iliff |
| 5,941,949 A | 8/1999 | Pedersen |
| 5,956,487 A | 9/1999 | Venkatraman et al. |
| 5,956,698 A | 9/1999 | Lacheze et al. |
| 5,961,586 A | 10/1999 | Pedersen |
| 5,968,116 A | 10/1999 | Day et al. |
| 5,970,149 A | 10/1999 | Johnson |
| 5,974,234 A | 10/1999 | Levine et al. |
| 5,975,737 A | 11/1999 | Crater et al. |
| 5,991,810 A | 11/1999 | Shapiro et al. |
| 6,003,061 A | 12/1999 | Jones et al. |
| 6,003,070 A | 12/1999 | Frantz |
| 6,003,078 A | 12/1999 | Kodimer et al. |
| 6,006,045 A | 12/1999 | Miyawaki |
| 6,009,274 A | 12/1999 | Fletcher et al. |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |
| 6,014,694 A | 1/2000 | Aharoni et al. |
| 6,016,535 A | 1/2000 | Krantz et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,023,721 A | 2/2000 | Cummings |
| 6,023,749 A | 2/2000 | Richardson |
| 6,025,925 A | 2/2000 | Davidson, Jr. et al. |
| 6,031,964 A | 2/2000 | Anderson |
| 6,041,041 A | 3/2000 | Ramanathan et al. |
| 6,042,111 A | 3/2000 | Rivers et al. |
| 6,057,857 A | 5/2000 | Bloomfield |
| 6,060,994 A | 5/2000 | Chen |
| 6,061,603 A | 5/2000 | Papadopoulos et al. |
| 6,064,915 A | 5/2000 | Kaneko et al. |
| 6,065,118 A | 5/2000 | Bull et al. |
| 6,081,623 A | 6/2000 | Bloomfield et al. |
| 6,088,718 A | 7/2000 | Altschuler et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,118,899 A | 9/2000 | Bloomfield et al. |
| 6,119,934 A | 9/2000 | Kolls |
| 6,122,463 A | 9/2000 | Nagatani |
| 6,125,363 A | 9/2000 | Buzzeo et al. |
| 6,130,999 A | 10/2000 | Serizawa et al. |
| 6,139,177 A | 10/2000 | Venkatraman et al. |
| 6,141,737 A | 10/2000 | Krantz et al. |
| 6,152,365 A | 11/2000 | Kolls |
| 6,157,944 A | 12/2000 | Pedersen |
| 6,161,145 A | 12/2000 | Bainbridge |
| 6,167,432 A | 12/2000 | Jiang |
| 6,167,448 A | 12/2000 | Hemphill et al. |
| 6,172,683 B1 | 1/2001 | Bloomfield |
| 6,175,866 B1 | 1/2001 | Holloway et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,205,466 B1 | 3/2001 | Karp et al. |
| 6,209,048 B1 | 3/2001 | Wolff |
| 6,221,011 B1 | 4/2001 | Bardy |
| 6,226,650 B1 | 5/2001 | Mahajan et al. |
| 6,230,199 B1 | 5/2001 | Revashetti et al. |
| 6,246,485 B1 | 6/2001 | Brown et al. |
| 6,256,378 B1 | 7/2001 | Iggulden et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 | 8/2001 | Papadopoulos et al. |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,289,461 B1 | 9/2001 | Dixon |
| 6,292,828 B1 | 9/2001 | Williams |
| 6,295,527 B1 | 9/2001 | McCormack et al. |
| 6,298,457 B1 | 10/2001 | Rachlin et al. |
| 6,304,895 B1 | 10/2001 | Schneider et al. |
| 6,307,570 B1 | 10/2001 | Stergiades |
| 6,308,099 B1 | 10/2001 | Fox et al. |
| 6,311,024 B1 | 10/2001 | Serizawa et al. |
| 6,312,378 B1 | 11/2001 | Bardy |
| 6,317,570 B1 | 11/2001 | Uchida et al. |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,327,594 B1 | 12/2001 | Van Huben et al. |
| 6,338,086 B1 | 1/2002 | Curtis et al. |
| 6,343,320 B1 | 1/2002 | Fairchild et al. |
| 6,356,933 B2 | 3/2002 | Mitchell et al. |
| 6,356,949 B1 | 3/2002 | Katsandres et al. |
| 6,366,741 B1 | 4/2002 | Fukushima |
| 6,368,284 B1 | 4/2002 | Bardy |
| 6,370,552 B1 | 4/2002 | Bloomfield |
| 6,370,570 B1 | 4/2002 | Muir et al. |
| 6,370,582 B1 | 4/2002 | Lim et al. |
| 6,377,162 B1 | 4/2002 | Delestienne et al. |
| 6,377,971 B1 | 4/2002 | Madden et al. |
| 6,381,557 B1 | 4/2002 | Babula et al. |
| 6,397,212 B1 | 5/2002 | Biffar |
| 6,405,310 B1 | 6/2002 | Simpson |
| 6,406,426 B1 | 6/2002 | Reuss et al. |
| 6,412,026 B1 | 6/2002 | Graf |
| 6,415,023 B2 | 7/2002 | Iggulden |
| 6,415,392 B1 | 7/2002 | Suzuki et al. |
| 6,421,671 B1 | 7/2002 | Bryan et al. |
| 6,421,719 B1 | 7/2002 | Lewis et al. |
| 6,426,798 B1 | 7/2002 | Yeung |
| 6,430,612 B1 | 8/2002 | Iizuka |
| 6,430,711 B1 | 8/2002 | Sekizawa |
| 6,434,572 B2 | 8/2002 | Derzay et al. |
| 6,437,692 B1 | 8/2002 | Petite et al. |
| 6,437,803 B1 | 8/2002 | Panasyuk et al. |
| 6,438,598 B1 | 8/2002 | Pedersen |
| 6,446,192 B1 | 9/2002 | Narasimhan et al. |
| 6,449,633 B1 | 9/2002 | Van et al. |
| 6,449,663 B1 | 9/2002 | Carney et al. |
| 6,453,127 B2 | 9/2002 | Wood et al. |
| 6,453,129 B1 | 9/2002 | Simpson et al. |
| 6,457,038 B1 | 9/2002 | Defosse |
| 6,462,831 B1 | 10/2002 | Akiyama |
| 6,466,971 B1 | 10/2002 | Humpleman et al. |
| 6,471,521 B1 | 10/2002 | Dornbush et al. |
| 6,477,117 B1 | 11/2002 | Narayanaswami et al. |
| 6,479,792 B1 | 11/2002 | Beiermann et al. |
| 6,487,513 B1 | 11/2002 | Eastvold et al. |
| 6,493,517 B1 | 12/2002 | Hanson |
| 6,493,871 B1 | 12/2002 | McGuire et al. |
| 6,494,831 B1 | 12/2002 | Koritzinsky |
| 6,510,350 B1 | 1/2003 | Steen et al. |
| 6,523,013 B2 | 2/2003 | Shah et al. |
| 6,523,063 B1 | 2/2003 | Miller et al. |
| 6,523,130 B1 | 2/2003 | Hickman et al. |
| 6,529,848 B2 | 3/2003 | Sone |
| 6,538,667 B1 | 3/2003 | Duursma et al. |
| 6,549,612 B2 | 4/2003 | Gifford et al. |
| 6,553,336 B1 | 4/2003 | Johnson et al. |
| 6,553,490 B1 | 4/2003 | Kottapurath et al. |
| 6,559,965 B1 | 5/2003 | Simpson et al. |
| 6,560,611 B1 | 5/2003 | Nine et al. |
| 6,560,641 B1 | 5/2003 | Powderly et al. |

(56) References Cited

U.S. PATENT DOCUMENTS

| | | |
|---|---|---|
| 6,560,656 B1 | 5/2003 | O'Sullivan et al. |
| 6,564,227 B2 | 5/2003 | Sakakibara et al. |
| 6,567,813 B1 | 5/2003 | Zhu et al. |
| 6,574,729 B1 | 6/2003 | Fink et al. |
| 6,581,092 B1 | 6/2003 | Motoyama et al. |
| 6,581,094 B1 | 6/2003 | Gao |
| 6,587,812 B1 | 7/2003 | Takayama |
| 6,587,879 B1 | 7/2003 | Reynolds |
| 6,591,272 B1 | 7/2003 | Williams |
| 6,598,011 B1 | 7/2003 | Koritzinsky et al. |
| 6,601,087 B1 | 7/2003 | Zhu et al. |
| 6,601,159 B1 | 7/2003 | Smith et al. |
| 6,604,212 B2 | 8/2003 | Sekizawa et al. |
| 6,609,108 B1 | 8/2003 | Pulliam et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,643,650 B1 | 11/2003 | Slaughter et al. |
| 6,643,690 B2 | 11/2003 | Duursma et al. |
| 6,646,655 B1 | 11/2003 | Brandt et al. |
| 6,651,110 B1 | 11/2003 | Caspers et al. |
| 6,651,190 B1 | 11/2003 | Worley et al. |
| 6,654,032 B1 | 11/2003 | Zhu et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,671,695 B2 | 12/2003 | McFadden |
| 6,681,344 B1 | 1/2004 | Andrew |
| 6,681,349 B2 | 1/2004 | Sekizawa |
| 6,684,259 B1 | 1/2004 | Discavage et al. |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,691,154 B1 | 2/2004 | Zhu et al. |
| 6,691,157 B2 | 2/2004 | Muir et al. |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,738,798 B1 | 5/2004 | Ploetz et al. |
| 6,754,664 B1 | 6/2004 | Bush |
| 6,757,714 B1 | 6/2004 | Hansen |
| 6,757,899 B2 | 6/2004 | Zdankin et al. |
| 6,763,274 B1 | 7/2004 | Gilbert |
| 6,763,501 B1 | 7/2004 | Zhu et al. |
| 6,766,333 B1 | 7/2004 | Wu et al. |
| 6,775,238 B1 | 8/2004 | Suzuki et al. |
| 6,779,004 B1 | 8/2004 | Zintel |
| 6,782,542 B1 | 8/2004 | Mein et al. |
| 6,785,015 B1 | 8/2004 | Smith et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,789,119 B1 | 9/2004 | Zhu et al. |
| 6,792,337 B2 | 9/2004 | Blackett et al. |
| 6,799,209 B1 | 9/2004 | Hayton |
| 6,799,270 B1 | 9/2004 | Bull et al. |
| RE38,609 E | 10/2004 | Chen et al. |
| 6,804,712 B1 | 10/2004 | Kracht |
| 6,807,580 B2 | 10/2004 | Freeman et al. |
| 6,810,488 B2 | 10/2004 | Teng |
| 6,816,616 B2 | 11/2004 | Teng |
| 6,823,397 B2 | 11/2004 | Rawson, III |
| 6,826,606 B2 | 11/2004 | Freeman et al. |
| 6,831,555 B1 | 12/2004 | Miller et al. |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,886,046 B2 | 4/2005 | Stutz et al. |
| 6,891,830 B2 | 5/2005 | Curtis |
| 6,901,448 B2 | 5/2005 | Zhu et al. |
| 6,904,593 B1 | 6/2005 | Fong et al. |
| 6,920,480 B2 | 7/2005 | Mitchell et al. |
| 6,922,724 B1 | 7/2005 | Freeman et al. |
| 6,925,335 B2 | 8/2005 | May et al. |
| 6,925,645 B2 | 8/2005 | Zhu et al. |
| 6,928,469 B1 | 8/2005 | Duursma et al. |
| 6,940,405 B2 | 9/2005 | Script et al. |
| 6,950,991 B2 | 9/2005 | Bloomfield et al. |
| 6,952,714 B2 | 10/2005 | Peart |
| 6,963,899 B1 | 11/2005 | Fernandez et al. |
| 6,972,676 B1 | 12/2005 | Kimmel et al. |
| 6,973,491 B1 | 12/2005 | Staveley et al. |
| 6,983,020 B2 | 1/2006 | Christiansen |
| 6,985,779 B2 | 1/2006 | Hsiung et al. |
| 6,986,040 B1 | 1/2006 | Kramer et al. |
| 6,990,395 B2 | 1/2006 | Ransom et al. |
| 7,003,574 B1 | 2/2006 | Bahl |
| 7,016,966 B1 | 3/2006 | Saulpaugh et al. |
| 7,020,706 B2 | 3/2006 | Cates et al. |
| 7,020,773 B1 | 3/2006 | Otway et al. |
| 7,028,025 B2 | 4/2006 | Collins |
| 7,028,081 B2 | 4/2006 | Kawashima |
| 7,031,342 B2 | 4/2006 | Teng |
| 7,032,005 B2 | 4/2006 | Mathon et al. |
| 7,043,677 B1 | 5/2006 | Li |
| 7,046,134 B2 | 5/2006 | Hansen |
| 7,051,084 B1 | 5/2006 | Hayton et al. |
| 7,057,724 B1 | 6/2006 | Mead et al. |
| 7,065,576 B2 | 6/2006 | Kamel et al. |
| 7,069,298 B2 | 6/2006 | Zhu et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 | 8/2006 | Gandhi et al. |
| 7,085,824 B2 | 8/2006 | Forth et al. |
| 7,089,567 B2 | 8/2006 | Giradot et al. |
| 7,091,846 B2 | 8/2006 | Wu |
| 7,092,370 B2 | 8/2006 | Jiang et al. |
| 7,099,110 B2 | 8/2006 | Detzler |
| 7,100,200 B2 | 8/2006 | Pope et al. |
| 7,103,357 B2 | 9/2006 | Kirani et al. |
| 7,103,799 B2 | 9/2006 | Dixon |
| 7,113,988 B2 | 9/2006 | Chirashnya et al. |
| 7,116,681 B1 | 10/2006 | Hovell et al. |
| 7,117,239 B1 | 10/2006 | Hansen |
| 7,117,243 B2 | 10/2006 | Peart |
| 7,127,525 B2 | 10/2006 | Coleman et al. |
| 7,130,883 B2 | 10/2006 | Zhu et al. |
| 7,142,839 B2 | 11/2006 | Pelaez et al. |
| 7,149,792 B1 | 12/2006 | Hansen |
| 7,158,483 B1 | 1/2007 | Takabatake et al. |
| 7,162,315 B2 | 1/2007 | Gilbert |
| 7,162,628 B2 | 1/2007 | Gentil et al. |
| 7,178,149 B2 | 2/2007 | Hansen |
| 7,185,014 B1 | 2/2007 | Hansen |
| 7,194,743 B2 | 3/2007 | Hayton et al. |
| 7,203,755 B2 | 4/2007 | Zhu et al. |
| 7,213,051 B2 | 5/2007 | Zhu et al. |
| 7,216,172 B2 | 5/2007 | Yang et al. |
| 7,234,943 B1 | 6/2007 | Aleali |
| 7,254,601 B2 | 8/2007 | Baller et al. |
| 7,266,526 B1 | 9/2007 | Drummond et al. |
| 7,290,061 B2 | 10/2007 | Lentini et al. |
| 7,293,176 B2 | 11/2007 | Otway et al. |
| 7,330,872 B2 | 2/2008 | Peart et al. |
| 7,334,119 B2 | 2/2008 | Gentil et al. |
| 7,340,772 B2 | 3/2008 | Panasyuk et al. |
| 7,346,842 B1 | 3/2008 | Hayton et al. |
| 7,353,253 B1 | 4/2008 | Zhao |
| 7,359,953 B2 | 4/2008 | Muir et al. |
| 7,376,695 B2 | 5/2008 | Duursma et al. |
| 7,421,484 B2 | 9/2008 | Das |
| 7,444,071 B2 | 10/2008 | Chen |
| 7,453,379 B2 | 11/2008 | Plamondon |
| 7,460,038 B2 | 12/2008 | Samuels et al. |
| 7,490,166 B2 | 2/2009 | Yang et al. |

(56) References Cited

U.S. PATENT DOCUMENTS

| Patent/Publication No. | Date | Inventor(s) |
|---|---|---|
| 7,496,097 B2 | 2/2009 | Rao et al. |
| 7,502,726 B2 | 3/2009 | Panasyuk et al. |
| 7,502,784 B2 | 3/2009 | Collins |
| 7,529,767 B2 | 5/2009 | DeAnna et al. |
| 7,532,134 B2 | 5/2009 | Samuels et al. |
| 7,542,471 B2 | 6/2009 | Samuels et al. |
| 7,555,529 B2 | 6/2009 | Bloomfield et al. |
| 7,562,121 B2 | 7/2009 | Berisford |
| 7,562,146 B2 | 7/2009 | Panasyuk et al. |
| 7,562,226 B2 | 7/2009 | Aiken et al. |
| 7,565,526 B1 | 7/2009 | Shaw et al. |
| 7,581,005 B2 | 8/2009 | Montemayor et al. |
| 7,584,294 B2 | 9/2009 | Plamondon |
| 7,587,755 B2 | 9/2009 | Kramer |
| 7,593,514 B1 | 9/2009 | Zhuang et al. |
| 7,594,018 B2 | 9/2009 | Pedersen |
| 7,596,593 B2 | 9/2009 | Mitchell et al. |
| 7,606,902 B2 | 10/2009 | Rao et al. |
| 7,609,721 B2 | 10/2009 | Rao et al. |
| 7,613,131 B2 | 11/2009 | Decasper et al. |
| 7,617,531 B1 | 11/2009 | Chauhan et al. |
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 7,937,370 B2 | 5/2011 | Hansen |
| 7,966,418 B2 | 6/2011 | Shedrinsky |
| 8,055,758 B2 | 11/2011 | Hansen |
| 8,060,886 B2 | 11/2011 | Hansen |
| 8,108,543 B2 | 1/2012 | Hansen |
| 2001/0007117 A1 | 7/2001 | Cooper et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0049717 A1 | 12/2001 | Freeman et al. |
| 2001/0052999 A1 | 12/2001 | Hiraoka et al. |
| 2001/0056547 A1 | 12/2001 | Dixon |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0052932 A1 | 5/2002 | Curtis et al. |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen |
| 2002/0116550 A1 | 8/2002 | Hansen |
| 2002/0133753 A1 | 9/2002 | Mayberry et al. |
| 2002/0135801 A1 | 9/2002 | Tessman |
| 2002/0138567 A1 | 9/2002 | Ogawa |
| 2002/0144016 A1 | 10/2002 | Spicer et al. |
| 2002/0157090 A1 | 10/2002 | Anton, Jr. |
| 2002/0174085 A1 | 11/2002 | Nelson et al. |
| 2002/0178241 A1 | 11/2002 | Eriksson |
| 2002/0191612 A1 | 12/2002 | Curtis |
| 2003/0014733 A1* | 1/2003 | Ringseth et al. ............... 717/116 |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1 | 3/2003 | Miyata et al. |
| 2003/0063119 A1 | 4/2003 | Bloomfield et al. |
| 2003/0063309 A1 | 4/2003 | Parry |
| 2003/0070006 A1* | 4/2003 | Nadler et al. ............... 709/330 |
| 2003/0072027 A1 | 4/2003 | Haines et al. |
| 2003/0118353 A1 | 6/2003 | Baller |
| 2003/0136837 A1 | 7/2003 | Amon et al. |
| 2003/0140234 A1 | 7/2003 | Noda et al. |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0177172 A1 | 9/2003 | Duursma et al. |
| 2003/0182375 A1 | 9/2003 | Zhu |
| 2003/0200285 A1 | 10/2003 | Hansen et al. |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027373 A1 | 2/2004 | Jacquot et al. |
| 2004/0027376 A1 | 2/2004 | Calder et al. |
| 2004/0098515 A1 | 5/2004 | Rezvani et al. |
| 2004/0128370 A1 | 7/2004 | Kortright |
| 2004/0139309 A1 | 7/2004 | Gentil et al. |
| 2004/0152450 A1 | 8/2004 | Brasher et al. |
| 2004/0158630 A1 | 8/2004 | Chang et al. |
| 2004/0158631 A1 | 8/2004 | Chang et al. |
| 2004/0177124 A1 | 9/2004 | Hansen |
| 2004/0186693 A1 | 9/2004 | Xiang et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0119930 A1 | 6/2005 | Simon |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0251551 A1 | 11/2005 | Mitchell et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Brasher et al. |
| 2006/0066448 A1 | 3/2006 | Berisford et al. |
| 2006/0069668 A1 | 3/2006 | Braddy et al. |
| 2006/0069750 A1 | 3/2006 | Momtchilov et al. |
| 2006/0069753 A1 | 3/2006 | Hu et al. |

(56) References Cited

U.S. PATENT DOCUMENTS

| | | |
|---|---|---|
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0150249 A1 | 7/2006 | Gassen et al. |
| 2006/0159080 A1 | 7/2006 | Mazzaferri et al. |
| 2006/0159432 A1 | 7/2006 | Mazzaferri et al. |
| 2006/0161555 A1 | 7/2006 | Mazzaferri et al. |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0161974 A1 | 7/2006 | Innes et al. |
| 2006/0179143 A1 | 8/2006 | Walker et al. |
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shabazi et al. |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |
| 2006/0248144 A1 | 11/2006 | Zhu |
| 2006/0271875 A1 | 11/2006 | Green et al. |
| 2006/0271877 A1 | 11/2006 | Theurer et al. |
| 2006/0282521 A1 | 12/2006 | Anderson et al. |
| 2007/0005736 A1 | 1/2007 | Hansen et al. |
| 2007/0011295 A1 | 1/2007 | Hansen |
| 2007/0011356 A1 | 1/2007 | Schauser et al. |
| 2007/0022159 A1 | 1/2007 | Zhu |
| 2007/0056009 A1 | 3/2007 | Spilo et al. |
| 2007/0077917 A1 | 4/2007 | Kim |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0063149 A1 | 3/2008 | West et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | Von Eicken et al. |
| 2008/0069104 A1 | 3/2008 | Von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154957 A1 | 6/2008 | Taylor et al. |
| 2008/0201405 A1 | 8/2008 | Duursma et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock et al. |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |
| 2012/0143970 A1 | 6/2012 | Hansen |
| 2012/0158914 A1 | 6/2012 | Hansen |
| 2012/0158982 A1 | 6/2012 | Hansen |

FOREIGN PATENT DOCUMENTS

| | | |
|---|---|---|
| EP | 1 362 282 | 11/2003 |
| EP | 1 695 485 | 8/2006 |
| FR | 2797728 | 2/2001 |
| GB | 2305820 | 4/1997 |
| JP | 60-263162 | 12/1985 |
| JP | 06-062130 | 3/1994 |
| JP | 07-325513 | 12/1995 |
| JP | 09-163008 | 6/1997 |
| JP | 09-305407 | 11/1997 |
| JP | 09-325925 | 12/1997 |
| JP | 10-190922 | 7/1998 |
| JP | 10-224372 | 8/1998 |
| JP | 11-045195 | 2/1999 |
| JP | 11-203079 | 7/1999 |
| JP | 11-296453 | 10/1999 |

(56) References Cited

FOREIGN PATENT DOCUMENTS

| JP | 10-295788 | 4/2000 |
|---|---|---|
| JP | 2000-112863 | 4/2000 |
| JP | 2000-122952 | 4/2000 |
| JP | 2000-163283 | 6/2000 |
| JP | 2000-278773 | 10/2000 |
| JP | 2000-309145 | 11/2000 |
| JP | 2001-337817 | 12/2001 |
| JP | 2003-223603 | 8/2003 |
| WO | WO97/30879 | 8/1997 |
| WO | WO98/20439 | 5/1998 |
| WO | WO98/33302 | 7/1998 |
| WO | WO98/38910 | 9/1998 |
| WO | WO98/41943 | 9/1998 |
| WO | WO99/21336 | 4/1999 |
| WO | WO99/57649 | 11/1999 |
| WO | WO99/57837 | 11/1999 |
| WO | WO99/57838 | 11/1999 |
| WO | WO99/64958 | 12/1999 |
| WO | WO00/23894 | 4/2000 |
| WO | WO02/10919 | 2/2002 |
| WO | WO02/21239 | 3/2002 |
| WO | WO02/21299 | 3/2002 |
| WO | WO02/21414 | 3/2002 |
| WO | WO02/21415 | 3/2002 |
| WO | WO02/21777 | 3/2002 |
| WO | WO02/25501 | 3/2002 |
| WO | WO03/021464 | 3/2003 |
| WO | WO03/054439 | 7/2003 |
| WO | WO2004/059447 | 7/2004 |
| WO | WO2006/009402 | 1/2006 |
| WO | WO2008/083177 | 7/2008 |

OTHER PUBLICATIONS

Anderson, Professional XML, 2000.*
Jack Koftikian, Simple Object Access Protocol, 2000.*
"Frequently Asked Questions about the Extensible Markup Language—The XML FAQ" Version 1.41(oasis-open.org/cover/xmlFAQ141-19981006.html) (Oct. 6, 1998).
24×7, HealthTech Publishing Company, Inc. (Nov. 1996).
"Remote Diagnostics: Strategic weapon in the war for multi-vendor service contracts," Tech Assessment, vol. 3, No. 12, Dec. 1995.
"Siemens Medical, BJC Health System Extend deal to multivendor service," Medical Imaging News, vol. 6, No. 26, Jun. 27, 1997.
Dec. 27, 1995, SCAN Diagnostic Imaging, vol. 8, No. 24.
Apr. 22, 2005 Literature Search by Keyword: CyberTAC.
Adelberg, D., "Building Robust Wrappers for Text Sources", [online] Retrieved from the Internet:<URL:http://student.bu.ac.bd/~mumit/Research/NLP-bib/papers/Adelberg99.pdf> [retrieved on Nov. 24, 2008] (1999).
Allegro Software product release 1-61 overview Greenhills Software Inc., [online] Jun. 10, 2002, pp. I-I, XPOO2201939 Retrieved from the Internet: <URL: ghs.com/partners/allegro/> [retrieved on Jun. 10, 2002] the whole document.
Allegro, RomWebClient Embedded HTTP client Toolkit: ALLEGROSOFT, Circuit Cellar Online, Sep. 7, 2000, pp. 1-2, XP-002201983, URL:http://web.archive.orgweb/20000709204234/.allegrosoft.com/romwebclient.html.
"RomWebClient Embedded HTTP client 1-61 Toolkit" ALLEGROSOFT, 'Online! Jul. 9, 2000. pp. 1-2, XPOO2201938, Retrieved from the Internet<URL: http://web.archive.org/web/20000709204234/.allegrosoft.com/romwebclient.html> retrieved on Jun. 12, 2002 the whole document.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Ennis, D., "CORBA and XML Integration in Enterprise Systems", IONA Technologies Inc.[online], Retrieved from the Internet:<URL:http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section EI, Week 200156, Abstract, Document No. XP002253876 (Korea Electronics & Telecom Res Inst.) Derwent Publications, Ltd., London, GB, (Mar. 5, 2001).
Eastvold, Roger, "Services: The Next Generation," The Professional Journal, vol. 20, No. 4.
Eastvold, Roger, "Tiss and Tell," Medical Imaging, Sep. 1995.
EBITS:Electronic Business & Information Technology for Society Research Consortium, Proposal for Development of an Educational and Research Infrastructure for Safe Electronic Commerce, [online] Retrieved from the Internet:<URL:cs.dartmouth.edu/~makedon/cs188/proposal.html>, [retrieved Feb. 15, 2005].
Jiang, et al., "Record-Boundary Discovery in Web Documents", [online] Retrieved from the Internet:<URL:http://osm7.cs.byu.edu/deg/papers/SJ.Thesis.ps>, [retrieved on Nov. 24, 2008] (1998).
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 17, 1999).
EmWare Press Release: "emWare Delivers EMIT 3.0 SDK Pro—A Complete Device Networking Kit for Developing End-to-end, Embedded Device Networking Solutions," Salt Lake City, UT (May 24, 1999).
EmWare Press Release: "emWare, IBM Demonstrate Next Phase in Establishing Worldwide Access to Embedded Devices," Chicago, IL (Mar. 2, 1999).
EmWare Press Release: "emWare's emLink (TM) Used to Internet-enable Welch Allyn's Vital Signs Monitor," Chicago, IL (Mar. 2, 1999).
EmWare Press Release: "Invensys Selects emWare EMIT Device-Networking Software to Add Remote Monitoring and Control Capabilities to its Controller Products," Salt Lake City, UT (Jun. 14, 1999).
EmWare Press Release: "Motorola, Mitsubishi and National Semiconductor Join emWare's Embed The Internet Alliance," Chicago, IL (Mar. 2, 1999).
Franklin, M. et al., "Data in Your Face: PUSH Technology in Perspective", Proc. ACM SIGMOD Int'l Conf. on Mgmt of Data, ( Jun. 1998), #XP000886180, pp. 516-519.
Hanckmann, J., "Telescript: The Emerging Standard for Intelligent Messaging," Philips Telecommunications Review, vol. 52(1), pp. 15-19 (Mar. 1994).
Universal Plug & Play Device Architecture, (C) Microsoft Corporation (Jun. 8, 2000), [online] Retrieved from the Internet: <URL:upnp.org/specs/arch/upnpda10_20000613.htm>, [retrieved on Nov. 24, 2008].
Incremona, A. "Remote Service Diagnostics for Imaging Equipment: Today and Tomorrow," Advanced Imaging, 12(9):90(2) (1997).
Jennyc, Kenn S., "Linking Enterprise Business Systems to the Factory Floor," The Hewlett-Packard Journal, Article 9 (May 1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet<URL:.intelligententerprise.com/010416/webhouse1_1.jhtml> [retrieved on Nov. 24, 2008] (Apr. 16, 2001).
Koppen, E., et al., "Active Hypertext for Distributed Web Applications", Enabling Technologies: Infrastructure for Collaborative Enterprises, (WET ICE '99), Proc. IEEE 8th Int'l Workshop (1999), pp. 297-302.

(56) References Cited

OTHER PUBLICATIONS

Kovar, J., "Xerox Unveils Expanded Channel Lineup; Also Plans to Introduce E-Mail, Queue Management Software," PC Expo,(Jun. 18, 1999).
Lassman, M. et al., "Modern Nuclear Medical Diagnostics with Efficient Gamma Cameras," Electromedica, 66(2):43-51, (1998).
Lewandowska, J., et al., "System for Grouping Technologically Similar Devices", v. 48 n 12; (Dec. 1975), pp. 636-638 (English Abstract).
Layman, et al., "XML-Data," Position Paper from Microsoft Corp. (Jun. 20, 1997), [online] Retrieved from the Internet<URL:oasis-open.org/cover/xml-data9706223.html> [retrieved on Sep. 2, 2004].
Lerner, R., "At the Forge: Introducing SOAP", Linux Journal, #XP002292162 , pp. 62-70, (Mar. 2001).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Martin, D., "Professional XML"., WROX Press Ltd., pub., Ch. 11, 'Server to Server', pp. 559-562, 819-820 (Jan. 2000).
Mason, K., "XML Translation for block structured languages", IBM Corporation: Research Disclosure, Kenneth Mason Publications, 44176 (Apr. 16, 2001).
Math Markup Language (Chapter 4); [online] Retrieved from the Internet:<URL:w3.org/TR/REC-MathML/chap4_4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet:<URL:mecca.org/~Itague/nsfnocostextension.html>, [retrieved on Feb. 15, 2005].
Mills et al., "A knowledge-based method for inferring semantic concepts from visual models of system behavior," ACM (Jul. 2000), pp. 306-337.
Orasis Medical Services, Inc., Business Plan Copy No. 001, (Nov. 1995).
Pfeiffer, R., "XML Tutorials for Programmers: Tutorial 2: Writing XML Documents," (1999) [online] Retrieved from the Internet:<URL:http://imb.com/xml>, [retrieved on Mar. 2, 1999].
Questra Applications Data Sheet (2002).
Questra Preliminary Invalidity Contentions, dated Apr. 29, 2005.
Reagan, K., "Technology for the Soul," OC Metro, (Sep. 1, 1995).
Rytting, T., "Dispensing the Goods, Embedded Style," Circuit Cellar Online, (Oct. 1999).
Schmidt, The Evolution of Workflow Standards, IEEE (1999).
SOAP Archives Online, "Multiple Method Calls in SOAP Packet"; [online] Retrieved from the Internet<URL:http://discuss.develop.com/archives/wa.exe?A2=ind9912&L=soap&T=O&F=&S=&P=25113>, [retrieved on Dec. 8, 2000].
Steinfeld, E. "Making the Change", Document No. XP002201937, Circuit Cellar Online, Apr. 2000, pp. 1-7.
Steinfeld, E., "From Standalone to Internet Appliance", Circuit Cellar Online, [online] (Jul. 9, 2000), #XP002201938, Retrieved from the Internet: <URL:http://web.archive.org/web/20000709204234/alegrosoft.com/romwebclient.html>retrieved on Jun. 12, 2002 the whole document.
Steinfeld, E., "Internet-appliance technology automates test equipment" EDN Magazine, pp. 157-169, Oct. 2000, www.edbmag.com.
Suresh et al., "XML-based Data System for Earth Science Applications", IEEE 2000 International, vol. 3, pp. 242-28, Jul. 2000.
Searls, "The Next Bang: The Explosive Combination of Embedded Linux, XML, and Instant Mess.", ACM (Sep. 2000) Issue 77 [online] Retrieved from the Internet:<URL:linuxjournal.com/article.php?sid=4195>, pp. 1-15, [retrieved on Nov. 20, 2001].
The Simple Times, vol. 7, No. 1, Mar. 1999; [online] Retrieved from the Internet:<URL:simple-times.org/pub/simple-times/issues/7-1.html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Virtual Reality Transfer Protocol (VRTP); Retrieved from the Internet:<URL:stl.nps.navy.mil/~brutzman/vrtp> (1998).
Walsh, Norman, "XSL the Extensible Style Language: Styling XML Documents," New Architect Daily, Jan. 1999.
Webmethods B2B Whitepaper; [online] Retrieved from the Internet:<URL:cs.wisc.edu/~vganti/papers/b2b_wpB2Bintegration.html> (1999).
White Paper, Medical Imaging, East Providence, RI (Sep. 1995).
Wigget, Jeremy, "Intraview: Roger Eastvold of Orasis Inc.," 24×7, Nov. 1996.
Williams, T., "Java Goes to Work Controlling Networked Embedded Systems" Computer Design, Pennwell Publ. Littleton, MA, 35:9:36-37, Aug. 1996.
Winer, Dave, "XML-RPC Specification," (http://XML-RPC.com), Jun. 15, 1999.
Winter 1992, Field of View, vol. 2, No. 3, Toshiba America Medical System, Inc.
Wu et al., "A knowledge sharing and collaboration system model based on Internet", Systems, Man, and Cybernetics, 1999. IEEE SMC'99 Conference Proceedings, vol. 2, pp. 148-152 (1999).
Xerox 190 Copier, Electronic Data Interface Operator Guide, ver. 1.0, (1989).
Van der Werff, M., et al., "A Mobile-Based Home Automatic System", IEEE Mobility Conference (2005).
Defense Information Systems Agency, Field Services Office, White Paper Report "pcAnywhere 10.5" (Sep. 2003).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.
Communication in EP Application No. 01973431.8, dated Mar. 30, 2005.
Examination Report in EP Application No. 01973431.8, dated Jan. 15, 2008.
Office Action in EP Application No. 01995993.9, dated Jan. 29, 2004.
Office Action in EP Application No. 01996048.3, dated Jun. 22, 2004.
Office Action from Application 01 973 431.8, dated Mar. 8, 2005.
Office Action in EP Application No. 01996048.3, dated Mar. 11, 2005.
Office Action in EP Application No. 01955993.9, dated Jun. 6, 2005.
Examination Report in EP Application No. 03719774.6, dated Sep. 12, 2005.
Examination Report in EP Application No. 03719774.6, dated Apr. 12, 2006.
Examination Report in EP Application No. 01973431.8, dated Feb. 6, 2009.
Search Report in EP Application No. 02792391.1, dated Nov. 19, 2009.
Examination Report in EP Application No. 01973431.8, dated Mar. 23, 2010.
Examination Report in EP Application No. 02792391.1, dated Mar. 10, 2010.
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
Notice of Reasons for Rejection in Japanese Application No. 2002-529431, dated Nov. 8, 2010.
Examination Report in EP Application No. 02792391.1, dated Feb. 27, 2012.
Machine Translation of Japanese Patent Publication No. 09-305407 (Pub Date Nov. 1997).
Machine Translation of Japanese Patent Publication No. 11-296453, (Pub Date Oct. 1999).
Machine Translation of Japanese Patent Publication No. 11-203079, (Pub Date Jul. 1999).

(56) References Cited

OTHER PUBLICATIONS

Machine Translation of Japanese Patent Publication No. 2000-309145, (Pub Date Nov. 2000).
Machine Translation of Japanese Patent Publication No. 2001-337817, (Pub Date Dec. 2001).
Machine Translation of Japanese Patent Publication No. 11-045195, (Pub Date Feb. 1999).
Machine Translation of Japanese Patent Publication No. 2000-163283, (Pub Date Jun. 2000).
Final Decision for Rejection in Japanese Patent Application No. 2002-515578, dated Jul. 10, 2012.
International Search Report in Application No. PCT/US2002/040058, dated Nov. 3, 2003.
International Preliminary Examination Report in Application No. PCT/US2002/040058, dated Jun. 10, 2004.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
International Preliminary Report on Patentability (incl. Written Opinion) in Application No. PCT/US2007/088858, dated Jul. 9, 2009.
International Search Report &. Written Opinion in Application No. PCT/US2007/088858, dated May 21, 2008.
Summons to attend Oral Proceedings in counterpart EP Application No. 01973431.8, dated Feb. 2, 2011.
Second Auxillary Response in EP Application No. 01973431.8, dated Apr. 26, 2011.
Oral Proceedings Communication in Application No. EP01973431.8, dated May 12, 2011.
Decision to Refuse in Application No. EP01973431.8, dated Jun. 21, 2011.
Action in Application No. JP 2002-515578, dated Jul. 26, 2011.
Response filed in Application No. JP2002-529431, dated May 2, 2011.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9 (Nov. 29, 2005).
Oral Proceeding Minutes in European Application No. 01955993.9, dated Jan. 16, 2006.
Communication dated Apr. 26, 2005 in European Application No. 01955993.9.
Action and Response History in U.S. Appl. No. 11/537,399.
Action and Response History in U.S. Appl. No. 11/538,402.
Action and Response History in U.S. Appl. No. 11/616,136.
Action and Response History in U.S. Appl. No. 11/774,474.
Action and Response History in U.S. Appl. No. 13/329,928.
Action and Response History in U.S. Appl. No. 09/627,201.
Action and Response History in U.S. Appl. No. 10/805,012.
Action and Response History in U.S. Appl. No. 09/667,737.
Office Action for U.S. Appl. No. 09/667,737 mailed Feb. 23, 2004.
Action and Response History in U.S. Appl. No. 11/677,279.
Action and Response History in U.S. Appl. No. 09/716,717.
Action and Response History in U.S. Appl. No. 09/708,384.
Action and Response History in U.S. Appl. No. 11/503,638.
Action and Response History in U.S. Appl. No. 10/123,960.
Action and Response History in U.S. Appl. No. 11/673,943.
Action and Response History in U.S. Appl. No. 10/124,181.
Action and Response History in U.S. Appl. No. 10/784,138, filed Sep. 23, 2010.
Action and Response History in U.S. Appl. No. 10/028,126.
upnp.org/download.UPnPDA10_20000613.HTM (52 pgs).
XP-002253876, c:\epodata\sea\eplogf\internal.log.
Wikipedia "GoToMyPC", [online] Retrieved from the Internet URL://en.wikipedia.org/wiki/Gotomypc [retrieved on Jan. 21, 2010] (2010).
Citrix Online, Citrix Systems, Inc. Whitle Paper, "GoToMyPC Security", [online] Retrieved from the Internet URL:citrix.it/REPOSITORY/docRepository/id_979_1124821417888736.pdf [retrieved on Mar. 16, 2010] (2004).
Citrix Online, Citrix Systems, Inc. Whilte Paper, "GoToMyPC Corporate Technology", [online] Retrieved from the Internet :<gotomypc.com/downloads/pdf/m/GoToMyPC_Corporate_Technology_White_Paper.pdf> [retrieved on Mar. 16, 2010] (2004).
ExpertCity, Inc., Whilte Paper, "GoToMyPC: Making Life Simpler for Teleworkers and Travelers", [online] Retrieved from the Internet: <si.umich.edu/Classes/540/Placement/GoOvrvew.pdf> [retrieved on Mar. 16, 2010] (2001).

\* cited by examiner

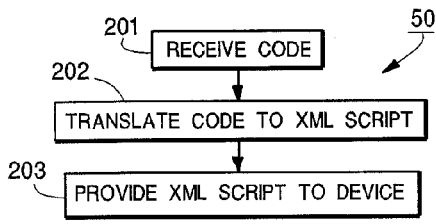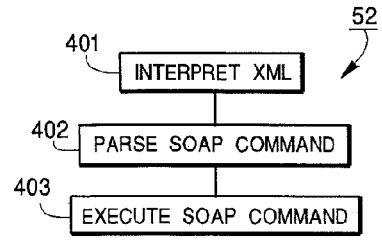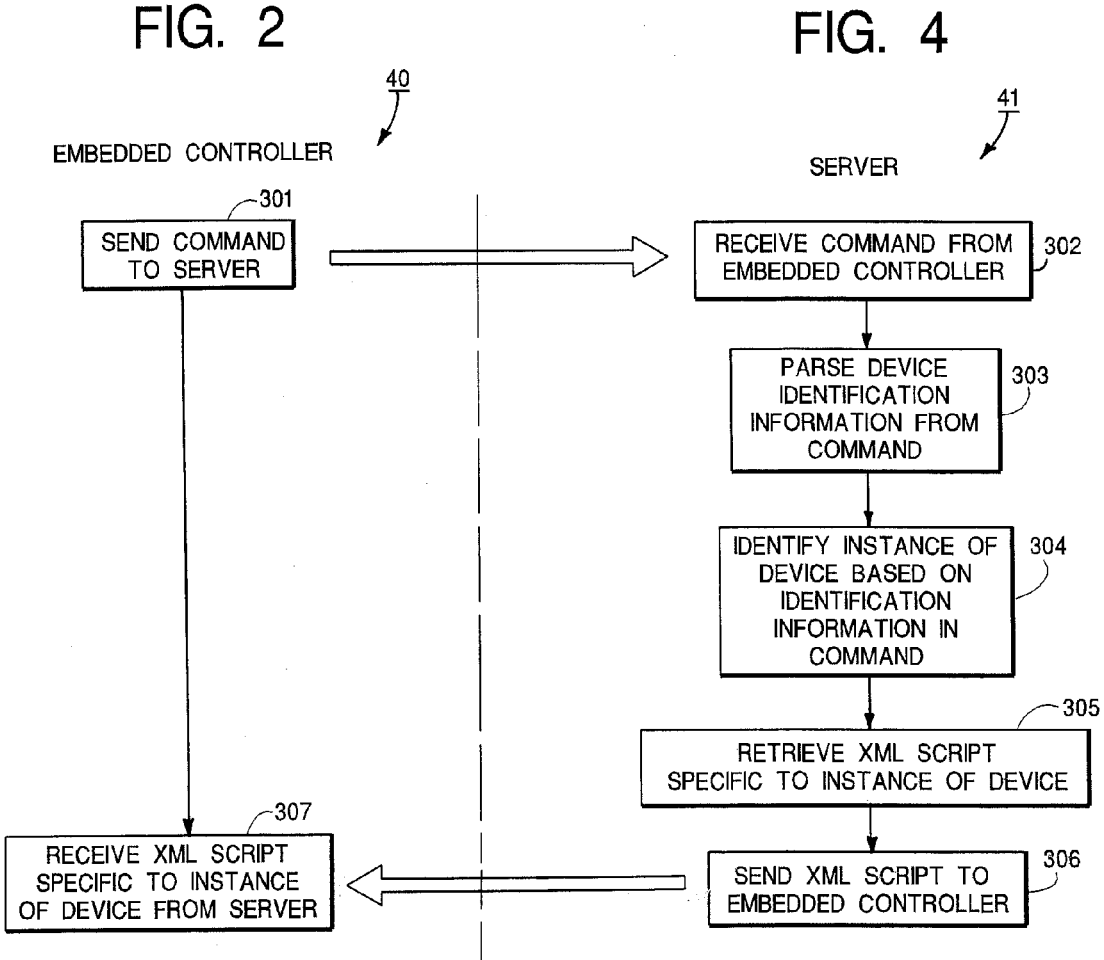

SCRIPTING OF SOAP COMMANDS

CROSS-REFERENCE TO RELATED APPLICATION

This application is a continuation (and claims the benefit of priority under 35 USC 120) of U.S. application Ser. No. 11/673,943, filed Feb. 12, 2007 (now U.S. Pat. No. 8,060, 886), which is a divisional of U.S. application Ser. No. 10/123,960, filed Apr. 17, 2002 (now U.S. Pat. No. 7,178, 149). The disclosures of the prior applications are considered part of (and are incorporated by reference in) the disclosure of this application as if set forth herein in full.

TECHNICAL FIELD

This invention relates generally to scripting simple object access protocol (SOAP) commands using extensible markup language (XML) and to providing the resulting XML script to a device for execution.

BACKGROUND

An apparatus may contain an embedded controller or agent software to monitor and control its operation. Any type of apparatus may have an embedded controller or agent including, but not limited to, home appliances, office equipment, medical devices, and industrial tools. Other examples include robots, blood analyzers, multifunction copiers, and air conditioners.

Embedded devices are often connected to an internal network, such as a local area network (LAN), with an interface to the Internet. Other devices on the internal network may communicate with an embedded device over the internal network. However, the embedded device is not generally addressable from the Internet. To address this problem, the embedded device may initiate communications with an addressable external device. That is, the embedded device may access the external device (e.g., a server) periodically to obtain necessary data.

SOAP is a standard for encoding function calls, such as remote procedure calls (RPCs), in XML. SOAP defines rules, i.e., a syntax, for encoding the function calls in XML. The body of a SOAP command is defined, at its start, by <SOAP-ENV:BODY> and, at its end, by </SOAP-ENV:BODY>. Code in between these two commands includes the function to be performed by the SOAP command. A SOAP command may include other data as well, such as header information.

SUMMARY

Heretofore, SOAP commands were only available as individual, discrete commands. This is impractical for device-initiated communication, particularly if the device is unaware of any timing issues relating to execution of the SOAP commands. The invention therefore scripts one or more SOAP commands in XML and provides the XML script to a device, such as an embedded controller, for execution. The XML script is executed by the embedded controller, much like a computer program, to control execution of the SOAP commands. For example, timing and sequence of execution of the SOAP commands may be specified in the XML script.

The invention also defines variables in the XML script, which may be passed to and from the SOAP commands. This facilitates the combination of SOAP commands in XML script and provides an advantage over the use of traditional SOAP commands, which are limited to passing "hard-coded" numerical values (i.e., non-variables).

In general, in one aspect, the invention is directed to a computer-implemented system for processing a simple object access protocol (SOAP) command. The system includes interpreting an XML script to perform a function contained in the XML script, the XML script containing the SOAP command, parsing the SOAP command from the XML script, and passing the SOAP command to a SOAP interpreter for execution. This aspect of the invention may include one or more of the following features.

Plural SOAP commands may be contained in the XML script. The plural SOAP commands may be passed to the SOAP interpreter. The plural SOAP commands may be executed in a sequence specified by the XML script. At least one of an argument and a return value may be received from the SOAP command following execution of the SOAP command. The argument may be stored as a variable in the XML script.

The XML script may declare a variable. A value of the variable may be passed as an argument to the SOAP command prior to executing the SOAP command. The function may be a conditional statement. The conditional statement may be an If-Then statement or an If-Then-Else statement. The function may be a control statement that affects a sequence of execution of the XML script and/or the SOAP command. The control statement may be a loop. The function may be an exception handler that affects a sequence of execution of the XML script and/or the SOAP command when an error condition exists. The function may be a statement that controls relative or absolute time to execute the SOAP command. Parsing may be performed by an XML interpreter and executing may be performed by the SOAP interpreter. The XML interpreter may pass the SOAP command to the SOAP interpreter and the SOAP interpreter may pass an output of the SOAP command to the XML interpreter.

In general, in another aspect, the invention is directed to a computer-implemented system for generating extensible markup language (XML) script that contains a simple object access protocol (SOAP) command. The system includes receiving code that defines a function and the SOAP command and translating the code to XML script that performs the function and contains the SOAP command. This aspect of the invention may include one or more of the following features.

The XML script may be provided to a device. The device may include a controller that executes the XML script. The code may contain plural SOAP commands and functions. The XML script may contain the plural SOAP commands and functions. The XML script may declare a variable. A value of the variable value may be passed as an argument to the SOAP command in the XML script.

The function may be a conditional statement. The conditional statement may be an If-Then statement or an If-Then-Else statement. The function may be a control statement that affects a sequence of execution of the XML script and/or the SOAP command. The control statement may be a loop. The function may be an exception handler that that affects a sequence of execution of the XML script and/or the SOAP command when an error condition exists. The function may be a statement that controls a relative or absolute time to execute the SOAP command.

Other features and advantages of the invention will become apparent from the following description, including the claims and drawings.

BRIEF DESCRIPTION OF THE DRAWINGS

FIG. 2 is a flowchart showing a process for translating human-readable code into XML script;

FIG. 3 is a flowchart showing a process by which the embedded controller retrieves XML script for the device from the server; and FIG. 4 is a flowchart showing a process by which the embedded controller executes the XML script.

DESCRIPTION

Figure 1:
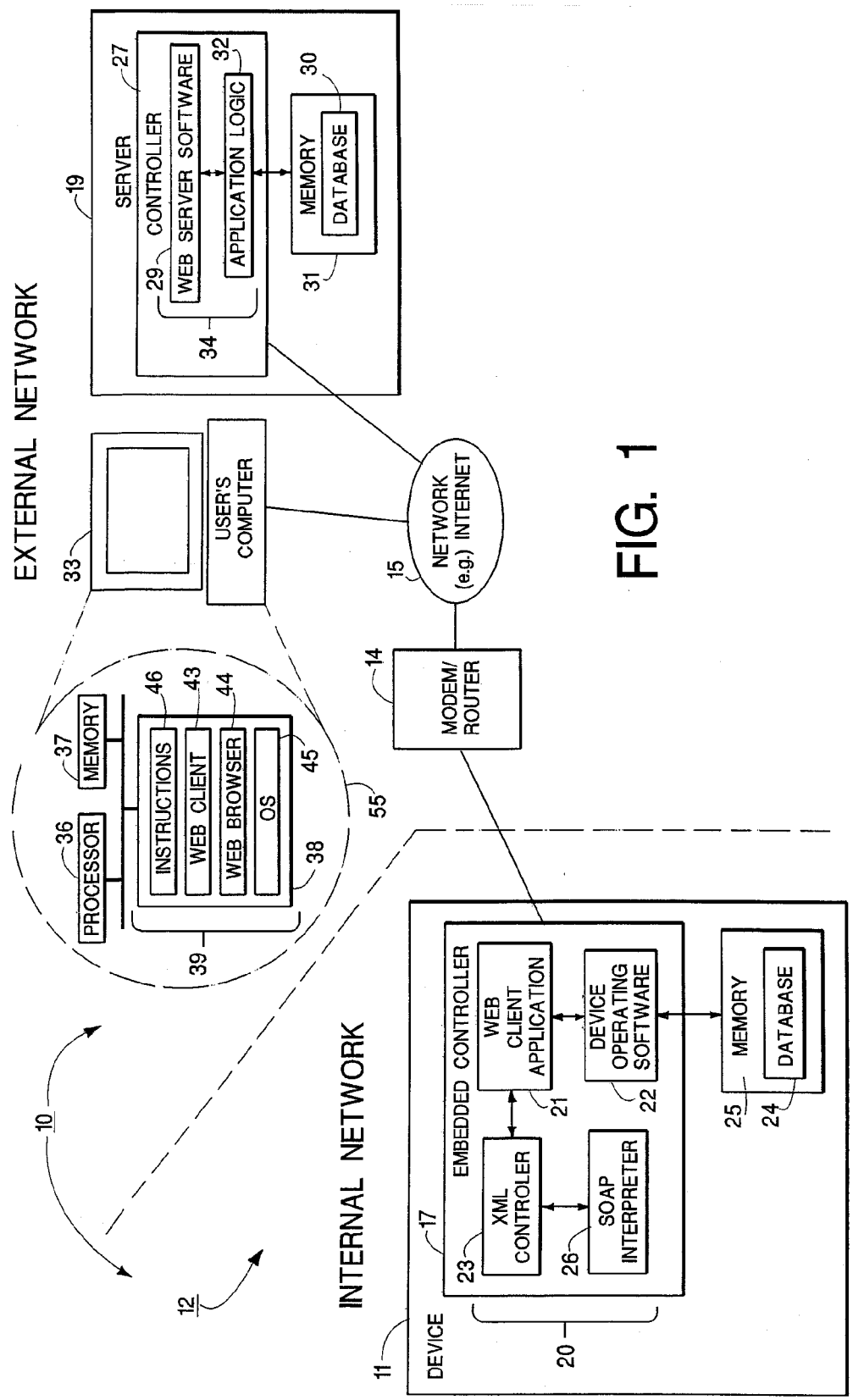
FIG. 1 is a block diagram of a network containing a server and a device having an embedded controller.

FIG. 1 shows a network 10. Network 10 includes a device 11 containing an embedded controller 17. Device 11 is any type of apparatus or system having functions that are monitored and controlled by embedded controller 17.

Device 11 is connected to an internal network 12, such as a LAN. A router or modem 14 couples internal network 12 to an external network 15, such as the Internet/World Wide Web (Web). External network 15 runs TCP/IP (Transmission Control Protocol/Internet Protocol) or some other suitable protocol. Network connections are via Ethernet, telephone line, wireless, or other transmission media.

External network 15 contains a server 19, which is a computer or any other processing device. Server 19 communicates with embedded controller 17 over external network 15 and internal network 12. Embedded controller 17 has a local IP (Internet Protocol) address that can be resolved within internal network 12. However, this local IP address may not be recognizable by devices on external network 15, such as server 19. As such, server 19 may not be able to directly address device 11.

Embedded Controller

Embedded controller 17 runs software 20, which includes Web client application 21 and operating software 22. Web client application 21 includes a TCP/IP protocol stack that allows embedded controller 17 to communicate over external network 15. Device operating software 22 provides an interface between Web client application 21 and a database 24 in memory 25. Through device operating software 22, embedded controller 17 retrieves data stored in database 24 and stores data in database 24.

Software 20 also includes an XML interpreter 23 and a SOAP interpreter 26. XML interpreter 23 is a module that receives XML script, parses the script, and performs the functions identified by the script. As background, XML is a self-describing computer language, meaning that fields in XML code identify variables and their values in the XML code. For example, a "data" field is delineated by "<data>" to indicate the start of the field and "</data>" to indicate the end of the field. XML is used because it can be generated, parsed and understood relatively easily.

Among the functions in the XML script may be an instruction to identify a SOAP command and to pass the SOAP command to SOAP interpreter 26 for processing. An example of another function includes a statement that controls relative or absolute time to execute the SOAP command. SOAP interpreter 26 receives SOAP commands from XML interpreter 23 and executes those commands. Examples of SOAP commands that can be executed by the embedded controller or agent include setting the value of a variable, uploading or downloading a file, restarting the software, or any action specific to the apparatus.

Database 24 stores data, such as operational parameters, XML script, and identification information for the instance of device 11. What is meant by "instance" is the specific identity of device 11 as distinguished from other identical devices. The identification information stored in database 24 identifies the instance of device 11. This identification information may include data identifying the type of the device, a common (or "friendly") name for the device, the manufacturer of the device, the model name of the device, the model number of the device, the serial number of the device, or a universal unique identifier (UUID) for the device.

The device type is the name of the device. The common name of the device is how the device is known in the vernacular, e.g., "television". The manufacturer identifies the manufacturer of the device, e.g., Sony®. The model name identifies the particular model of the device, e.g., Wega®. The model number identifies the model number of the device, e.g., XBR400®. The serial number identifies the serial number of a particular instance of the device, e.g., 53266D. The UUID is a universal identifier for the instance of the device, e.g., 4A89EA70-73B4-11d4-80DF-0050DAB7BAC5. Of the data shown above, generally only the serial number and the UUID are unique to the instance of device 11.

The identification data stored in database 24 is used by embedded controller 17 to retrieve XML script specific to the instance of device 11 (or for a particular type of device 11) from server 19. A device-initiated process for retrieving the XML script is described below.

Server

Server 19 is a computer that runs an HTTP (Hypertext Transfer Protocol) Web server computer program. Server 19 includes a controller 27, such as a microprocessor, for executing software to perform the functions described below. To avoid confusion in terminology, the following reads as though those functions are performed by server 19, even though software in controller 27 of server 19 performs the functions.

Server 19 executes Web server software 29 to communicate over external network 15. Web server software 29 also hosts a Web page associated with device 11. The Web page (not shown) is displayed on computer 33 of a user, such as the owner of device 11, who may select some actions to be sent to the device. For example, a remote operator may want to update three operational variables, which requires three SOAP commands. These three SOAP commands are wrapped in an XML script that executes the commands as a single operation. The XML script, along with any input updated operational parameters (if desired) are transmitted to Web server software 29 over external network 15. Web server software 29 stores the XML script in database 30 of memory 31. An example of a process for updating operational parameters is described in U.S. patent application Ser. No. 09/667,737, filed Sep. 22, 2000, the contents of which are incorporated into this application by reference as if set forth herein in full.

Web server software 29 stores and retrieves XML script from database 30 using application logic 32. Application logic 32 is software for accessing database 30 using Java servlets and a JDBC (Java Data Base Connectivity) database driver. The XML script can be stored in database 30 individually or as part of a configuration file for an instance of device 11.

Computer

Computer 33 is personal computer (PC) or other machine that includes a processor 36, a memory 37, and a storage medium 38 (see view 55). Storage medium 38 stores computer programs 39, which are executed by processor 36 out of memory 37. Computer programs 39 include a Web client application 43 containing a TCP/IP protocol stack for communicating over the Internet, a Web browser 44 such as Microsoft® Internet Explorer® for accessing Web pages, an operating system (OS) 45 such as Microsoft® Windows98®, and executable instructions 46 for implementing process 50, which is shown in FIG. 2.

Process 50 generates XML script containing one or more SOAP commands from user-generated code provided to computer 33. The code may be input by the user via a graphical user interface (GUI) (not shown), for example, or it may be retrieved from a storage medium or over network 15.

The code has a syntax that can be understood and interpreted by instructions 46. For example, the code may be a commonly-understood computer language, such as BASIC or "C", or a form of pseudo-code specific to the invention. The code defines functions, such as conditional statements (e.g., If-Then or If-Then-Else statements), control statements (e.g., do While or do Until loops), or exception handlers, meaning fail-safe mechanisms that are triggered in the code in the event that an instruction in the code fails. The functions affect the sequence of execution of the resulting XML code and/or SOAP commands.

An example of user-generated C/C++ code is set forth below:

```
int local = 8;
int total = 0;
while ( total < 10 )
{
    total = SomeFunction(total);
    AnotherFunction(local);
}
```

This code initializes integer variables "local" and "total" to values of "8" and "0" respectively. The code includes a "While" loop, meaning that the loop between the brackets "{ }" is continually executed while the value of total is less than "10", whereafter processing within the loop is discontinued. Within the loop, the value of "total" is set equal to the result of a SOAP command called "SomeFunction" processing the previous value of "total" and another SOAP command called "AnotherFunction" processing "local".

Process 50 receives (201) code, such as that shown above, that defines one or more functions (e.g., a "While" loop) and one or more SOAP commands (e.g., "SomeFunction" and "AnotherFunction"). Process 50 translates (202) the code to XML script that, when interpreted, performs the functions and contains the SOAP commands. To perform the translation, process 50 may compile the code, interpret the functions in the compiled code, and generate appropriate XML script from the compiled code. An appropriate compiler may be included within instructions 46 for this purpose. The format of the SOAP commands may be static and known to the compiler, or the format may be determined dynamically from a WSDL (Web Services Description Language) document. WSDL is a standard for describing SOAP commands. WSDL is itself an XML document that can be interpreted automatically. WSDL defines the set of functions available and the format of each of the SOAP commands.

WSDL usually describes the functionality for a particular device or Web service. By reading WSDL, a program can display functions to a user, then create SOAP command(s) for the function(s) selected by the user. By way of example, there may be one thousand devices, all with individual settings, and it is desired to set all of the devices to 6% lower power usage. Using traditional SOAP commands, the server must be able to address each device, obtain each device's current setting, calculate 94% of its value, then write that new value back to each device, all through issuing individual SOAP commands. Using a SOAP script, the same script can be sent to all of the devices because the variable is evaluated locally at each device. As the population of monitored devices grows, this kind of distributed processing becomes more useful.

Continuing with the example set forth above, process 50 translates (202) the code into the following XML script:

```
<Root>
    <Variables>
        <local type="integer">8</local>
        <total type="integer">0</total>
    </Variables>
    <Script>
        <While condition="total < 10">
            <SOAP-ENV:Body>
                <SomeFunction>
                    <Count>total</Count>
                </SomeFunction>
            </SOAP-ENV:Body>
            <Return variable="total"/>
            <SOAP-ENV:Body>
                <AnotherFunction>
                    <Input>local</Input>
                </AnotherFunction>
            </SOAP-ENV:Body>
        </While>
    </Script>
</Root>
```

The XML script contains the same functions and SOAP commands as the original C/C++ code input by the user. For example, the "While" loop is expressed as
    <While condition="total <10"> and </While>
and the SOAP commands are expressed as

```
<SOAP-ENV:Body>
    <SomeFunction>
        <Count>total</Count>
    </SomeFunction>
</SOAP-ENV:Body>
``` and

```
<SOAP-ENV:Body>
    <AnotherFunction>
        <Input>local</Input>
    </AnotherFunction>
</SOAP-ENV:Body>
```

The expression "<Return variable="total"/>" returns the value of the variable "total" to the XML script. Thus, the output of the SOAP command may be passed back to the XML script as an argument in the SOAP command and used as a variable in the XML script. Also, the XML script may be written so that a variable, such as "total", is passed as an argument to a SOAP command.

An example of XML script containing a conditional "IF" statement is set forth in Appendix A attached hereto. An example of XML script containing an exception handler is set forth in Appendix B attached hereto.

After the code has been translated (202) to XML script, process 50 provides (203) the XML script to server 19 over network 15. Process 50 may send the XML script to server 19 through a Web interface, along with identification information that specifies the instance of device 11 for which the XML script is intended. Web server software 29 on server 19 receives the XML script over network 15 and application logic 32 stores the XML script in database 30, along with its associated identification information.

Device-Initiated Retrieval of the XML Script

Embedded controller 17 executes software 20 to retrieve the XML script intended for device 11 from remote server 19. In response, server 19 executes software 34 to send the XML script to embedded controller 17. FIG. 3 shows these processes in detail. The left half of FIG. 3, titled "Embedded Controller" shows process 40 performed by embedded controller 17, and the right half of FIG. 3, titled, "Server", shows process 41 performed by server 19.

Process 40 generates and sends (301) a command to server 19. The command, or a modified version thereof, is sent by embedded controller 17 to server 19 periodically. It is through this command that embedded controller 17 polls server 19 to determine if there is any new/updated XML script for device 11 on server 19.

The command includes XML data identifying device 11. The data identifies the specific instance of device 11 and may include a device type field and one or both of a device serial number field and a device UUID. The command may also include a common name field, a manufacturer name field, a model name field, and a model number field, which specify the information set forth above for the device.

The command may be either an HTTP GET command or an HTTP post command. The data included in those commands is similar, with the difference being that the HTTP GET command retrieves a document, such as a file containing the XML script, and the HTTP POST command retrieves information, such as the XML script itself.

Process 41 (in server 19) receives (302) the HTTP command from embedded controller 17. Process 41 identifies the command as either a POST or GET command based on a header, such as "POST/CONTROL HTTP/1.1" (for a POST command), in the command. Process 41 uses an XML parser to parse (303) the various identifying fields, such as device type, serial number, and UUID, from the command.

Process 41 identifies (304) the instance of device 11 based on the information parsed from the command. That is, process 41 uses the device type, serial number, and UUID field information to identify the instance of device 11.

If the Command is a POST Command

The identification information from the command, in particular the device serial number and/or UUID, is used to search through database 30 for XML script specific to device 11. Once the appropriate XML script has been identified (304), process 41 retrieves (305) that XML script from database 30 using application logic 32. Process 41 determines if the XML script has been updated since it was last retrieved. This may be done by examining a revision number or date included in a header associated with the XML script. If the XML script has been updated, process 41 adds the updated XML script to the reply portion of POST command and sends (306) the POST command, with the updated XML script, back to embedded controller 17.

If the Command is a GET Command

As was the case above with the POST command, the identification information from the command is used to search through database 30 for XML script for the specific instance of device 11. In particular, the device serial number and/or UUID are used to retrieve (305) a configuration file that is specific to device 11. The configuration file contains the XML script for device 11. Process 41 sends (306) the configuration file to embedded controller 17.

Process 40 receives (307) the XML script containing one or more SOAP commands from server 19 in response to the HTTP command. Process 40 (in particular Web client application 21 in device 11) provides the XML script to XML interpreter 23, where the XML script is executed.

Referring to FIG. 4, a process 52 is shown for executing the XML script in embedded controller 17. Process 52 is implemented by executable instructions in XML interpreter 23 and SOAP interpreter 26.

XML interpreter 23 interprets (401) the XML script to perform the functions contained therein. For example, if there are any conditional statements, control statements, or exception handlers defined by the XML script, XML interpreter performs those functions on the appropriate commands and variables contained in the XML script.

During processing, XML interpreter 23 parses (402) the XML script to identify any SOAP commands contained in the XML script. Identified SOAP commands are passed to SOAP interpreter 26, which executes (403) the SOAP commands. Results of the SOAP commands may be passed back to the XML interpreter 23 for further processing. Likewise, variables may be passed from the XML script to the SOAP commands.

Using XML script in this manner, embedded controller 17 is able to execute multiple SOAP commands in response to a single device-initiated query. Thus, device 11 can perform reconfiguration operations or the like using multiple SOAP commands without maintaining communication with an external device, such as server 19, during the reconfiguration process. The XML script can specify (future) times at which the SOAP commands are to be executed, thus providing the device with further control over its own operation. SOAP interpreter 26 implements the SOAP standard to interpret and execute function calls. As more devices and software systems have support for SOAP, device 11 will be able to execute a script that controls multiple devices by calling their SOAP services.

Architecture

Processes 40, 41, 50 and 52 are not limited to use with the hardware/software configuration of FIG. 1; they may find applicability in any computing or processing environment. Processes 40, 41, 50 and 52 may be implemented in hardware (e.g., an ASIC {Application-Specific Integrated Circuit} and/or an FPGA {Field Programmable Gate Array}), software, or a combination of hardware and software.

Processes 40, 41, 50 and 52 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 40, 41, 50 and 52.

Processes 40, 41, 50 and 52 may also be implemented as an article of manufacture, such as one or more machine-readable storage media (e.g., compact or floppy disc), each configured with a computer program, where, upon execution, instructions in the computer program cause a machine (e.g., a computer) to operate in accordance with one or more of processes 40, 41, 50 and 52.

The invention is not limited to use with the protocols and standards described above. For example, Web server may use Java Servlets, ASP (Active Server Pages), ISAPI (Internet Server Application Programming Interface), or .NET interfaces to communicate with application logic 32. The HTTP commands sent by embedded controller 17 and/or server 19 are not limited to HTTP GET and POST commands. Any commands and/or requests for requesting and receiving data may be used.

The invention is not limited to the protocols and architecture described with respect to FIG. 1. Similarly, the invention is not limited to device-initiated transfers of the XML script. For example, computer 33 may transmit the XML script directly to embedded controller 17 (rather than by way of server 19) via e-mail, file transfer protocol (FTP), message queues, or any other type of data transfer mechanism. These other transfer protocols may also be used with device-initiated transfers. Server 19 may generate the XML script and transmit it directly to controller 17. The XML script may be used on any machine, and is not limited to use with embedded controllers. RPCs other than SOAP calls may be scripted using XML and the resulting XML script may be processed in the manner described herein. SOAP commands other than those described herein may be used. The processes described herein may be implemented using circuitry such as programmable logic, logic gates, a processor, and/or a memory.

Other embodiments not specifically described herein are also within the scope of the following claims.

APPENDIX A

The following C/C++ code shows a loop with a condition, and a conditional if statement:

```
int local = 8;
int total = 0;
while ( total < 10 )
{
    total = SomeFunction(total);
    if( total == 2)
        AnotherFunction(local);
    else
        SomethingElse( );
}
```

The XML script uses a <While> element with an attribute called condition to control the loop. The XML interpreter evaluates the condition and executes the sub elements of <While>. When a <SOAP-ENV:Body> element is detected, that element and its children are extracted and passed to the SOAP interpreter. After the SOAP command has run, the results are passed back to the XML script interpreter. If the SOAP command was successful, a return code may be provided, although not all SOAP functions have a return code. This return code is assigned to a script variable if a <Return> element is present.

In this example, there is also an <If> element. The XML interpreter evaluates the condition and executes the sub elements if the condition is true. If the condition is not true and an <Else> element follows, then the sub elements of <Else> are executed.

The XML script for the above C/C++ code is as follows:

```
<Root>
    <Variables>
        <local type="integer">8</local>
        <total type="integer">0</total>
    </Variables>
```

```
<Script>
    <While condition="total < 10">
        <SOAP-ENV:Body>
            <SomeFunction>
                <Count>total</Count>
            </SomeFunction>
        </SOAP-ENV:Body>
        <Return variable="total"/>
        <If condition="total == 2">
            <SOAP-ENV:Body>
                <AnotherFunction>
                    <Input>local</Input>
                </AnotherFunction>
            </SOAP-ENV:Body>
        </If>
        <Else>
            <SOAP-ENV:Body>
                <SomethingElse>
                </SomethingElse>
            </SOAP-ENV:Body>
        </Else>
    </While>
</Script>
</Root>
```

APPENDIX B

This following C/C++ code shows an exception handler:

```
int local = 8;
int total = 0;
try
{
    while ( total < 10 )
    {
        total = SomeFunction(total);
        AnotherFunction(local);
    }
}
catch
{
    Cleanup(total);
}
```

Exception handlers allow the XML script to handle failures. When a SOAP command executes properly, the XML script execution continues. When a SOAP command fails within a <Try> element, the XML interpreter breaks out of the <Try> element. If a <Catch> element exists, the XML interpreter begins executing there. XML scripts thus can process failures separately from regular return codes.

The XML script for the above C/C++ code is as follows:

```
<Root>
    <Variables>
        <local type="integer">8</local>
        <total type="integer">0</total>
    </Variables>
    <Script>
        <Try>
            <While condition="total < 10">
                <SOAP-ENV:Body>
                    <SomeFunction>
                        <Count>total</Count>
                    </SomeFunction>
                </SOAP-ENV:Body>
                <Return variable="total"/>
                <SOAP-ENV:Body>
                    <AnotherFunction>
```

```
            <Input>local</Input>
        </AnotherFunction>
    </SOAP-ENV:Body>
            </While>
        </Try>
        <Catch>
            <SOAP-ENV:Body>
                <Cleanup>
                    <Input>total</Input>
                </Cleanup>
            </SOAP-ENV:Body>
        </Catch>
    </Script>
</Root>
```

What is claimed is:

1. A method performed by one or more processing devices comprising:
   polling a server for script relating to a device;
   receiving the script from the server, the script being in a self-describing computer language, the script comprising simple object access protocol (SOAP) commands and executable code that is in the self-describing computer language and that defines functions to be performed on variables to be passed from the executable code to corresponding SOAP commands;
   interpreting a part of the script to perform a function contained in the script on a variable and to pass the variable to a SOAP command;
   parsing the SOAP command from the script;
   passing the SOAP command to a SOAP interpreter to execute the SOAP command with the variable; and
   repeating the interpreting, parsing and passing for a different part of the script comprising a different function, a different variable, and a different SOAP command;
   wherein interpreting, parsing, passing and repeating are performed without requiring further communication to the server; and
   wherein the function comprises an If-Then statement or an If-Then-Else statement.

2. The method of claim 1, wherein at least some of the SOAP commands are executed in a sequence specified by the script.

3. The method of claim 1, further comprising:
   receiving the variable from the SOAP command following execution of the SOAP command; and
   using the variable in a function contained in the script.

4. The method of claim 1, wherein:
   the script declares the variable; and
   a value of the variable is passed to the SOAP command prior to executing the SOAP command.

5. The method of claim 1, wherein the function comprises a conditional statement.

6. The method of claim 1, wherein the function comprises a control statement that affects a sequence of execution of the script and/or the SOAP command.

7. The method of claim 6, wherein the control statement comprises a loop.

8. The method of claim 1, wherein the function comprises an exception handler that affects a sequence of execution of the script and/or the SOAP command when an error condition exists.

9. One or more non-transitory machine-readable media storing instructions that are executable by one or more processors to perform operations comprising:
   polling a server for script relating to a device;
   receiving the script from the server, the script being in a self-describing computer language, the script comprising simple object access protocol (SOAP) commands and executable code that is in the self-describing computer language and that defines functions to be performed on variables to be passed from the executable code to corresponding SOAP commands;
   interpreting a part of the script to perform a function contained in the script on a variable and to pass the variable to a SOAP command;
   parsing the SOAP command from the script;
   passing the SOAP command to a SOAP interpreter to execute the SOAP command with the variable; and
   repeating the interpreting, parsing and passing for a different part of the script comprising a different function, a different variable, and a different SOAP command;
   wherein interpreting, parsing, passing and repeating are performed without requiring further communication to the server; and
   wherein the function comprises an If-Then statement or an If-Then-Else statement.

10. The one or more non-transitory machine-readable media of claim 9, wherein the one or more processors are embedded in the device.

11. The one or more non-transitory machine-readable media of claim 9, wherein at least some of the SOAP commands are executed in a sequence specified by the script.

12. The one or more non-transitory machine-readable media of claim 9, wherein the operations further comprise:
   receiving the variable from the SOAP command following execution of the SOAP command; and
   using the variable in a function contained in the script.

13. The one or more non-transitory machine-readable media of claim 9, wherein:
   the script declares the variable; and
   a value of the variable is passed to the SOAP command prior to executing the SOAP command.

14. The one or more non-transitory machine-readable media of claim 9, wherein the function comprises a conditional statement.

15. The one or more non-transitory machine-readable media of claim 14, wherein the conditional statement comprises an If-Then statement or an If-Then-Else statement.

16. The one or more non-transitory machine-readable media of claim 9, wherein the function comprises a control statement that affects a sequence of execution of the script and/or the SOAP command.

17. The one or more non-transitory machine-readable media of claim 16, wherein the control statement comprises a loop.

18. The one or more non-transitory machine-readable media of claim 9, wherein the function comprises an exception handler that affects a sequence of execution of the script and/or the SOAP command when an error condition exists.

19. A system comprising:
   memory storing instructions that are executable; and
   one or more processors to execute the instructions to perform operations comprising:
      polling a server for script relating to a device;
      receiving the script from the server, the script being in a self-describing computer language, the script comprising simple object access protocol (SOAP) commands and executable code that is in the self-describing computer language and that defines functions to be performed on variables to be passed from the executable code to corresponding SOAP commands;

interpreting a part of the script to perform a function contained in the script on a variable and to pass the variable to a SOAP command;

parsing the SOAP command from the script;

passing the SOAP command to a SOAP interpreter to execute the SOAP command with the variable; and repeating the interpreting, parsing and passing for a different part of the script comprising a different function, a different variable, and a different SOAP command;

wherein interpreting, parsing, passing and repeating are performed without requiring further communication to the server; and wherein the function comprises an If-Then statement or an If-Then-Else statement.

20. The system of claim 19, further comprising:

one or more computing devices configured to perform operations comprising:

receiving code defining functions and SOAP commands;

translating the code to script comprising the self-describing computer language; and sending the script to the server.

21. The system of claim 20, wherein the server is configured to perform operations comprising:

receiving the script from the one or more computing devices;

storing the script in association with identification information that specifies an instance of the device for which the script is intended; and sending the script to the one or more processing devices in response to the polling.

22. The system of claim 19, wherein the one or more processing devices comprises a processor that is embedded in the device.

* * * * *